Patented Aug. 4, 1931

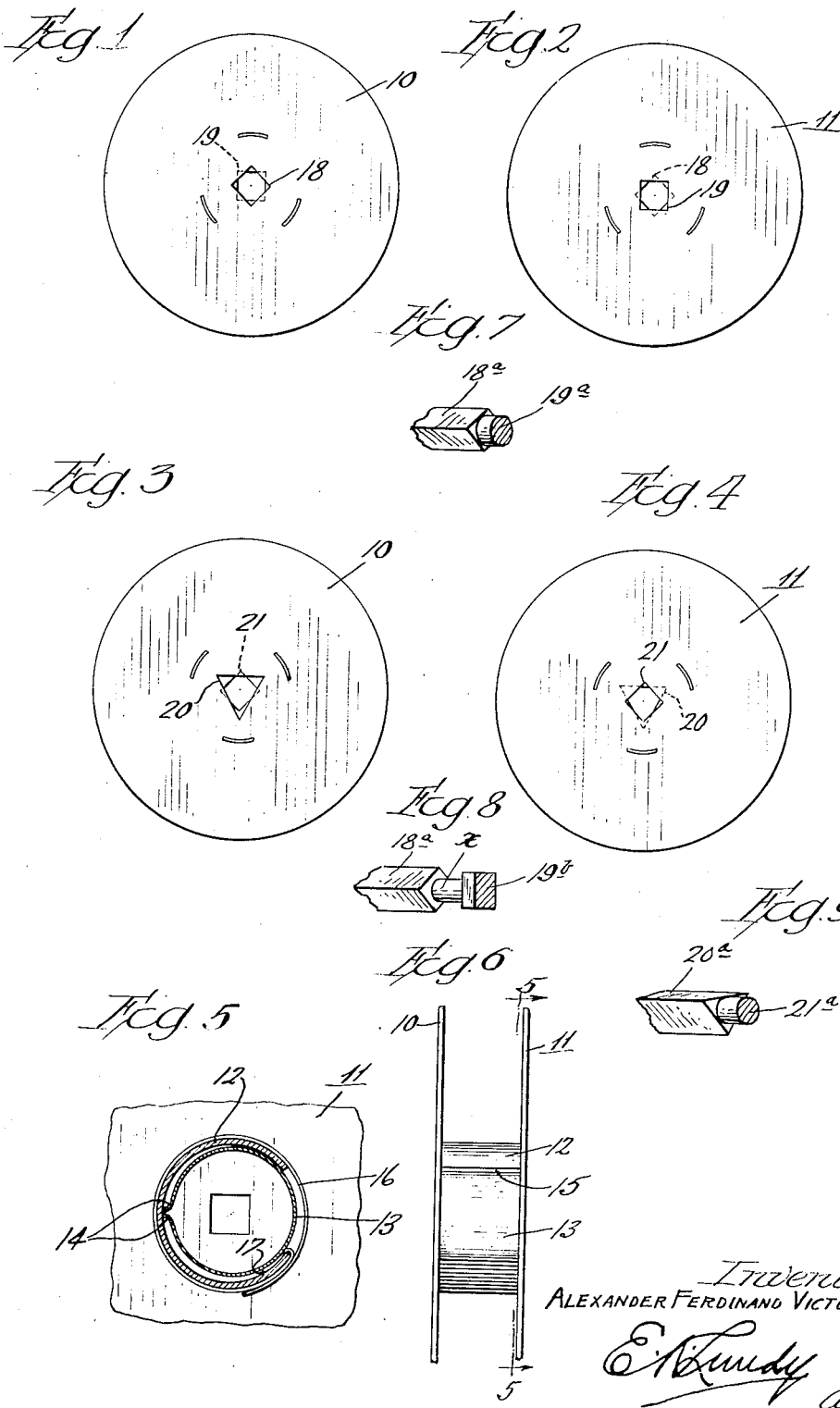

1,817,217

UNITED STATES PATENT OFFICE

ALEXANDER FERDINAND VICTOR, OF NEW YORK, N. Y.

FILM SPOOL AND MOUNTING

Application filed October 12, 1927. Serial No. 225,724.

Primarily, my improvements relate to the construction of a spool or reel upon which is wound the film or ribbon used in cinematography and also to a spindle upon which the spool is mounted for rotation. One of the objects of my present invention is to provide a spool with spindle openings that are adapted to receive spindles of various shapes in cross-section or being of different cross-sectional shapes at different points along the length of the spindle. Also it is an object of my invention to provide a spool or reel with openings that will receive a full cylindrical spindle as well as those above mentioned. Another object is to provide a film spool with means at the core of the spool for readily receiving and holding an end of the film while the latter is being wound upon or unwound from the spool. Further objects reside in providing a device of the character described that is novel in construction, effective in operation, and which will not materially increase the cost of production of the article.

I prefer to carry out my invention and to accomplish the several objects thereof in substantially the manner hereinafter fully described and as more particularly pointed out in the claims, reference being made to the accompanying drawings that form a part of this specification.

In the drawings:—

Fig. 1 is an elevation of one side of a spool made in accordance with the principles of my invention.

Fig. 2 is a similar view of the opposite side of said spool.

Fig. 3 is an elevation of a side of a spool made according to my invention but having the spindle openings slightly modified from the forms shown in Figs. 1 and 2.

Fig. 4 is a view of the opposite side of the spool illustrated in Fig. 3.

Fig. 5 is a transverse section through the core of a spool, slightly enlarged, and taken on line 5—5 of Fig. 6.

Fig. 6 is a vertical edge view of a spool.

Figs. 7, 8, and 9 are detail view in perspective showing types of spindles that may be used with the spools or reels.

In the drawings, which are more or less schematic, I have illustrated two preferred or typical forms in which the structure may be produced, and in said drawings similar reference characters have been employed to designate like parts wherever they appear throughout the several views.

The spool or reel proper is preferably in the form of a pair of parallel spaced walls or side-plates 10 and 11 that are of circular or disk-like form, and there is a central core 12 to which the side-plates are suitably secured. The side-plates and core are usually of sheet-metal, the latter being of cylindrical form with the side-plates disposed at the ends of the cylinder, and secured in place by tangs projecting from the ends of the core that are positioned in arcuate slots in the side-plates and then have their outer edges up-set upon the outer surfaces of said plates. Within the core there is placed, prior to assembly, a spring plate 13 that may be in the form of a coil or may have its ends deflected laterally outwardly as at 14 (Fig. 5) and there is an opening or slot 15 in the core to expose the spring. In securing the film or ribbon 16 to the spool its inner end 17 is positioned between the spring and the inner surface of the core of the film and when the spring is released it returns to normal position and will clamp the film in an effective manner.

The openings in the side-plates of the spool for the reception of the mounting spindle are of angular or polygonal formation, and practically all of the angles of one opening are positioned so that they are intermediate the angles of the opening in the opposite side-plate, and also the sides of these openings are in non-alinement with each other, although the axes of the openings aline. In Figs. 1 and 2 the spindle opening 18 in plate 10 is rectangular or square, consequently having four angles, and the opening 19 in plate 11 is also rectangular or square, but the angles of the latter opening are in non-alinement with the angles of the opening 18 and are positioned between the respective angles of the opposite opening as shown by the dotted lines in these two views. It will be noted that the vertical dimension of opening 18 is greater than the vertical dimension of the opening 19 because in the first opening this dimension is taken or measured upon the diagonal of the square. The same is true respecting the transverse dimensions of the respective openings. The axes of these openings 18 and 19 aline with each other so that a round bar or spindle may be used to mount the spool for free rotation, it being understood that the diameter of the bar or spindle is not greater than the dimensions of the sides of the angular openings. This formation and arrangement of the openings 18 and 19 permits the spool to be mounted upon a spindle having a rectangular body portion 18a with its outer end formed of round or cylindrical section 19a as in Fig. 7; also it permits the mounting of the spool upon a round spindle having a lateral projection or projections to be engaged in the corners or angles of the openings; or the square spindle 18a may have a squared end 19b connected by a reduced neck x as in Fig. 8, so that the spindle may be partly inserted and then either the spindle or the spool rotated to aline the parts of the spindle with the respective openings.

In Figs. 3 and 4 the side plate 10 is shown as provided with an opening 20 of triangular outline while the side-plate 11 has its alining spindle opening 21 of rectangular or square formation. All of the sides of one opening are in non-alinement with the other opening and practically all of the angles of the opening 21 are positioned between the angles of the opposite opening 20. This permits the use of the spool in connection with an all-around spindle, or a spindle having a triangular body 20a and a round end 21a as in Fig. 9 or having a round body and square end, which would be the reverse of the spindle shown in Fig. 7.

What I claim as new is:—

1. A spool for motion picture film or the like comprising a hub, and spaced side plates mounted on said hub, said plates provided with axially alined spindle openings of angular outline with the sides of the opening in one plate being offset with respect to the sides of the opening in the opposite plate and one of the openings having a greater number of sides than the other opening.

2. A spool for motion picture film or the like comprising a hub, and spaced side plates mounted on said hub, each plate having a spindle opening of angular outline in axial alinement with the opening in the other plate, said openings having different numbers of sides, all of the sides of the opening in one plate being off-set with respect to the sides of the opening in the other plate, and the vertical and transverse dimensions of one opening being greater than those of the other opening.

Signed at Davenport, Scott County, Iowa, this 5th day of Oct., 1927.

ALEXANDER FERDINAND VICTOR.